United States Patent
Hido (10) Patent No.: US 9,218,572 B2
(45) Date of Patent: Dec. 22, 2015

(54) TECHNIQUE FOR CLASSIFYING DATA

(75) Inventor: Shohei Hido, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 2169 days.

(21) Appl. No.: 12/270,721

(22) Filed: Nov. 13, 2008

(65) Prior Publication Data
US 2009/0125463 A1 May 14, 2009

(30) Foreign Application Priority Data
Nov. 13, 2007 (JP) ................................. 2007-294648

(51) Int. Cl.
*G06N 99/00* (2010.01)

(52) U.S. Cl.
CPC .................................... *G06N 99/005* (2013.01)

(58) Field of Classification Search
None
See application file for complete search history.

(56) References Cited

U.S. PATENT DOCUMENTS 6,938,049 B2  8/2005 Kamath et al. ................. 707/102
2006/0212386 A1* 9/2006 Willey et al. .................... 705/38

OTHER PUBLICATIONS

Li, Cen; "Classifying Imbalanced Data Using a Bagging Ensemble Variation (BEV)"; Mar. 2007; ACM; ACMSE 2007; pp. 203-208.*
Weiss, Gary M. et al.; "Learning When Training Data are Costly: The Effect of Class Distribution on Tree Induction"; 2003; AI Access Foundation; Journal of Artificial Intelligence Research 19; pp. 315-354.*
Anscombe, F. J.; "Sampling Theory of the Negative Binomial and Logarithmic Series Distributions"; 1950; Biometrika, vol. 37, No. 3/4; pp. 358-382.*
Mehta, Manish et al.; "SLIQ: A Fast Scalable Classifier for Data Mining"; 1996; Springe-Verlag; Proceedings of the 5th International Conference on Extending Database Technology: Advances in Database Technology; 15 pages.*
Zelterman, Daniel; Advanced Log-Linear Models Unsing SAS; 2002; SAS Institute, Inc.; Chapter 1 (Discrete Distributions); pp. 1-17.*
Tao et al., Asymmetric Bagging and Random Subspace for Support Vector Machines-Based Relevance Feedback in Image Retrieval, IEEE Transactions on Pattern Analysis and Machine Intelligence, vol. 28, No. 7, pp. 1088-1099 (Jul. 2006).
Leo Breiman, Bagging Predictor, Technical Report No. 421 pp. 1-20 (1996).

* cited by examiner

*Primary Examiner* — Stanley K Hill
(74) *Attorney, Agent, or Firm* — Ido Tuchman; William J. Stock (57) ABSTRACT

Provided is a system that generates models for classifying input data into a plurality of classes on the basis of training data previously classified into the plurality of classes. The system includes a sampling unit and a learning unit. The sampling unit samples, from the training data, a plurality of datasets each including a predetermined number of elements classified into a minority class and a corresponding number of elements classified into a majority class, the corresponding number being determined in accordance with the predetermined number. The learning unit learns each of a plurality of models for classifying the input data into the plurality of classes, by using a machine learning technique on the basis of each of the plurality of sampled datasets.

16 Claims, 6 Drawing Sheets

FIG. 1

| INQUIRY SUBJECT | ATTRIBUTE 1 | ATTRIBUTE 2 | ATTRIBUTE 3 | . . . | ATTRIBUTE M | CLASS |
|---|---|---|---|---|---|---|
| 0001 | 100 | 20 | 50 |  | 10 | A |
| 0002 | 90 | 20 | 45 |  | 10 | B |
| 0003 | 105 | 22 | 52 | . . . | 8 | A |
| 0004 | 100 | 22 | 80 |  | 10 | A |
| 0005 | 95 | 10 | 30 |  | 20 | B |
| ⋮ | ⋮ | ⋮ | ⋮ |  | ⋮ | ⋮ |

FIG. 2

| INQUIRY SUBJECT | ATTRIBUTE 1 | ATTRIBUTE 2 | ATTRIBUTE 3 | ... | ATTRIBUTE M |
|---|---|---|---|---|---|
| 0101 | 100 | 25 | 50 | | 10 |
| 0102 | 120 | 20 | 45 | | 10 |
| 0103 | 105 | 10 | 15 | ... | 8 |
| 0104 | 100 | 12 | 65 | | 10 |
| 0105 | 80 | 10 | 30 | | 15 |

TECHNIQUE FOR CLASSIFYING DATA

CROSS-REFERENCE TO RELATED APPLICATIONS

This application claims priority under 35 U.S.C. §119 to Japanese Patent Application No. 2007-294648 filed Nov. 13, 2007, the entire text of which is specifically incorporated by reference herein.

BACKGROUND OF THE INVENTION

The present invention relates to a technique for classifying data. In particular, the present invention relates to a technique for appropriately classifying data by learning a model on the basis of previously-given training data.

A classification problem in machine learning is known as a major problem applicable to various fields. For example, by solving a classification problem, a particular condition of a patient can be predicted based on his/her test result, or whether or not to give credit approval to a credit applicant can be judged based on an attribute of the applicant. A classification problem is: to learn correspondence relationships between data and classes by using training data that are classified into a plurality of classes; and to then appropriately classify data yet to be classified, on the basis of the learnt relationships. Relationships between data and classes are learned in order to improve the accuracy of classification. The accuracy of classification is often evaluated on a correct rate of classification.

For descriptions of sampling of training data for machine learning, the following documents can be referred to, for example.

[Patent document 1] Japanese Patent Application Publication No. 2005-92253

[Patent document 2] U.S. Pat. No. 6,938,049

[Non-patent document 1] Leo Breiman (1996), Bagging Predictor, Machine Learning, 24(2):123-140

[Non-patent document 2] Dacheng Tao et al. (2006), Asymmetric Bagging and Random Subspace for Support Vector Machines-Based Relevance Feedback in Image Retrieval, IEEE Transactions on Pattern Analysis and Machine Intelligence, 28(7):1088-1099

In some problems, however, it is inappropriate to use a correct rate of classification as the accuracy of classification. Assume that extremely few data are to be classified into a certain class, for example. In this case, if relationships between data and classes are learnt such that all the data would be classified into classes other than the certain class, a high correct rate can be obtained in the classification. However, such learning may sometimes obstruct acquisition of useful information. For example, through such learning, it is difficult to find, from a large number of patients, a small number of patients who have a particular disease, or to find, from a large number of credit applicants, a small number of applicants who are not eligible for credit approval.

BRIEF SUMMARY OF THE INVENTION

An aspect of the present invention provides a system for generating a model for classifying input data into a plurality of classes on the basis of training data in which elements are previously classified into the plurality of classes. The system includes a sampling unit and a learning unit. The sampling unit samples, from the training data, a plurality of datasets each including a predetermined number of elements classified into a minority class and a corresponding number of elements classified into a majority class, the corresponding number being determined in accordance with the predetermined number. The learning unit learns each of a plurality of models for classifying the input data into the plurality of classes, on the basis of each of the plurality of sampled datasets by using a machine learning technique. In addition, a program for causing a computer to function as the system and a method of learning models by using the system are also provided.

It should be noted that the above summary of the invention does not include all the essential characteristics of the invention, and that a sub-combination of the foregoing characteristics may also be regarded as the invention.

BRIEF DESCRIPTION OF THE SEVERAL VIEWS OF THE DRAWINGS

For a more complete understanding of the present invention and the advantage thereof, reference is now made to the following description taken in conjunction with the accompanying drawings.

DETAILED DESCRIPTION OF THE INVENTION

Hereinbelow, the present invention will be described on the basis of an embodiment of the invention. However, this embodiment is not intended to limit the invention defined by the scope of claims. Furthermore, all the combinations of the aspects described in the embodiment are not necessarily essential for solving means of the invention.

Figure 1:
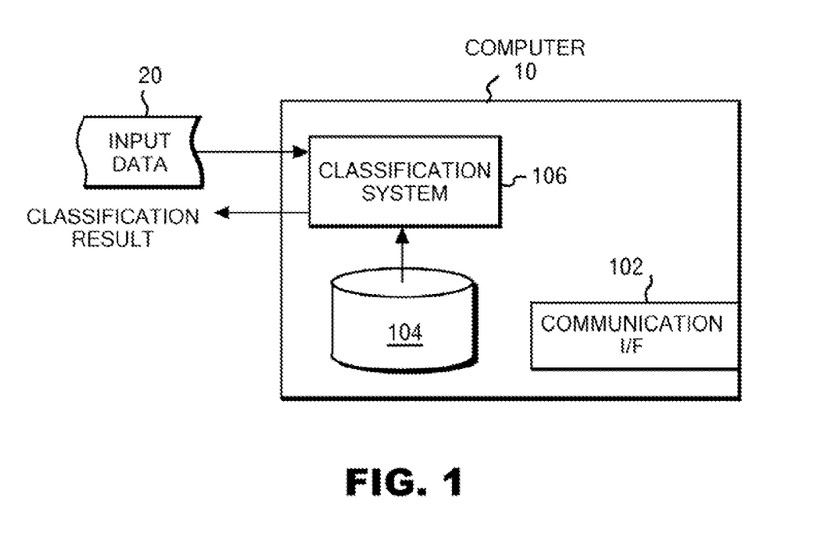
FIG. 1 shows a schematic configuration of a computer 10 according to an embodiment of the present invention.

FIG. 1 illustrates a schematic configuration of a computer 10 according to this embodiment. The computer 10 is provided with, as basic hardware a communication interface 102 such as a network interface card, and a storage device 104 such as a hard disk drive. A processor such as a CPU executes a program loaded from the storage device 104, so that the computer 10 functions as a classification system 106.

The classification system 106 generates models for classifying input data 20 into a plurality of classes, on the basis of training data stored in the storage device 104. An example of the training data is shown in FIG. 2.

Figure 2:
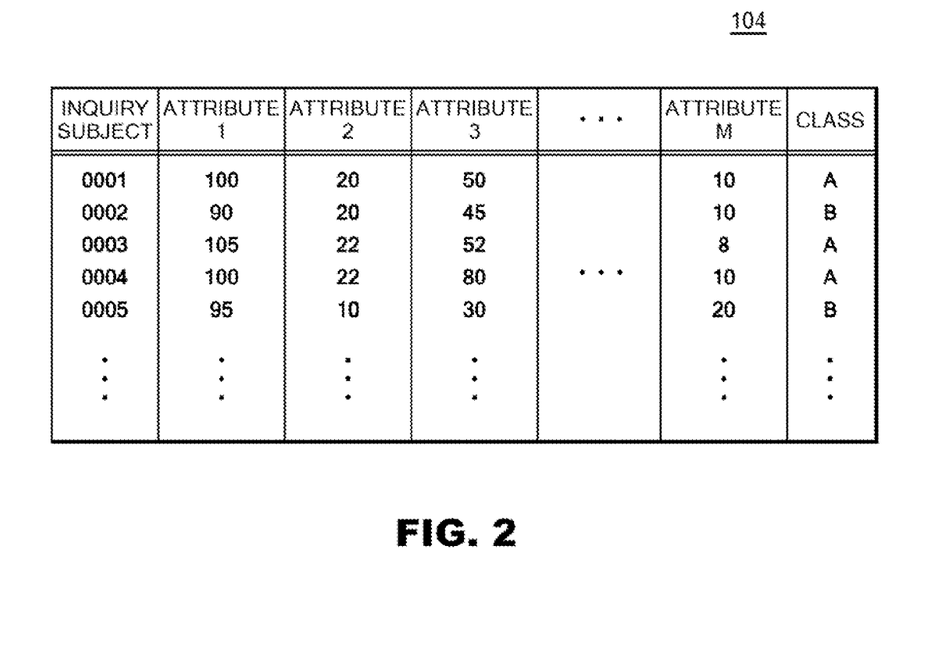
FIG. 2 shows a specific example of training data stored by a storage device 104 according to the embodiment.

FIG. 2 shows a specific example of the training data stored in the storage device 104 according to this embodiment. The storage device 104 stores, as training data, each of a plurality of elements previously classified into a plurality of classes in association with attributes of the element.

The example in FIG. 2 shows the training data used in a case where the classification system 106 is a support system for credit inquiry. In this example, elements are, for example, subjects of a credit inquiry, and are more particularly, individuals, groups, or corporations to be subjected to a credit inquiry. Here, the inquiry subjects are respectively denoted by identification numbers (IDs).

Each of the inquiry subjects has a plurality of attributes, Attribute 1 to Attribute M. One of the attributes may represent the past credit history of each of the inquiry subjects, for example. Other attributes may represent, for example, the age, the annual income, and the amount of asset of each of the inquiry subjects, respectively. As an example, the inquiry subject of ID 0001 has an attribute value of 100 for Attribute 1, an attribute value of 20 for Attribute 2, an attribute value of 50 for Attribute 3, and an attribute value of 10 for Attribute M.

Moreover, the storage device 104 stores a plurality of classes into which each of the inquiry subjects are classified. The plurality of classes include, for example, a class that a problem has happened as a result of giving credit approval to a corresponding inquiry subject, and a class that no problem has happened as a result of giving credit approval to a corresponding inquiry subject. As an example, the inquiry subject of ID 0001 is classified into Class A, while the inquiry subject of ID 0002 is classified into Class B. As described above, the training data of this example shows information, for each inquiry subject, on attributes, and on whether or not a problem has happened as a result of giving credit approval to the inquiry subject.

Alternatively, assume, for example, that the classification system 106 is a system for identifying patients who have a particular disease. In this case, the storage device 104 may store patients as the elements of the training data. In addition, the storage device 104 may store attributes of each of the patients, such as a result of a predetermined test, as attributes included in the training data. In addition, the storage device 104 may also store, as attributes of each of the patients, the age, the past medical history and the like of each of the patients. In this example, the classes each indicate either a corresponding patient has the particular disease or not, for example.

Still another example is a case where the classification system 106 is a system for detecting an unauthorized access or the like to a network system. In this case, the elements each represent a network access. Attributes of each of the elements may show, for example, the access time, the amount of time required for the access and the content of the access. In this example, the classes each indicate either a corresponding network access is an unauthorized access or not.

A case where the classification system 106 is a support system for detecting a misuse of a credit card is yet still another example. In such a case, the elements each represent a use of a credit card. Attributes of each of the elements may show, for example, the time of use, the amount of purchase, the store at which a purchase has been made and the chosen payment option. In this example, the classes each indicate either a corresponding credit card use is a misuse or not.

By using models generated on the basis of such training data described above, the classification system 106 classifies the elements of the input data 20 yet to be classified into the plurality of classes. An example of the input data 20 is shown in FIG. 3.

Figure 3:
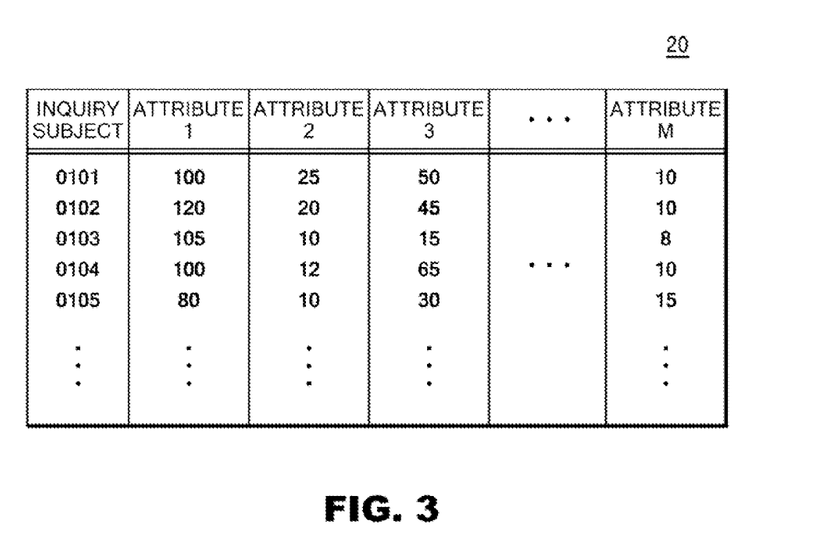
FIG. 3 shows a specific example of input data 20 according to the embodiment.

FIG. 3 shows a specific example of the input data 20 according to this embodiment. The input data 20 is stored by associating each of the plurality of elements with at least one attribute of the element. In the example of FIG. 3, as in the example of FIG. 2, the elements can be various specific subjects depending on the use of the computer 10. For example, when the computer 10 is to function as a support system for credit inquiry, the elements may be inquiry subjects which are to be newly subjected to a credit inquiry.

Similarly, attributes of the elements to be included also vary depending on the use of the computer 10. For example, when the computer 10 is to function as a support system for credit inquiry, the attributes are the past credit history and the like of a corresponding inquiry subject. However, the input data 20 does not have information on the class into which each of the inquiry subjects is classified.

In any of the above-described examples, credit card misuses, patients having a particular disease, unauthorized accesses or the like, for example, often account for only a small fraction of all the subjects. In view of such a case, an object of the classification system 106 is to accurately classify the yet to be classified elements of the input data 20 that are expected to exhibit class imbalance, by using models generated on the basis of training data with class imbalance. Hereinbelow, a specific description will be given.

Figure 4:
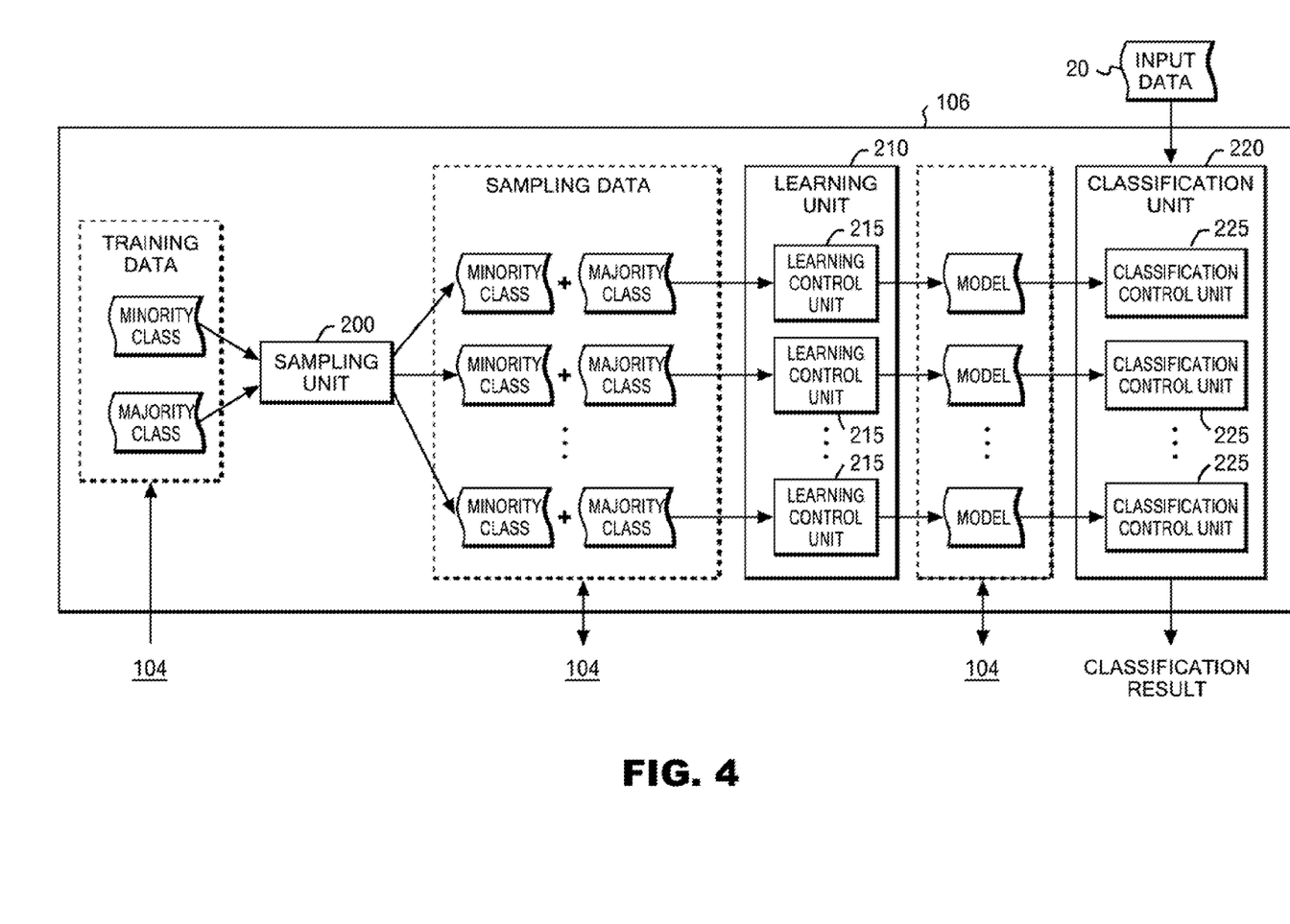
FIG. 4 shows an example of a functional configuration of a classification system 106 according to the embodiment.

FIG. 4 shows an example of the functional configuration of the classification system 106 according to this embodiment. The classification system 106 includes a sampling unit 200, a learning unit 210 and a classification unit 220. The sampling unit 200 reads training data from the storage device 104, and then samples, from the read training data, a plurality of datasets each including elements classified into the minority class and elements classified into the majority class.

This sampling may be a sampling of datasets with replacement, for example. Specifically, the CPU carries out processing for randomly reading, from the training data stored in the storage device 104, a predetermined number of elements classified into the minority class and a corresponding number of elements classified into the majority class, the corresponding number being determined in accordance with the predetermined number. Thereby, the sampling unit 200 samples the plurality of datasets. The sampled datasets are each stored in the storage device 104.

Here, the minority class indicates a class for elements which are previously known to be contained less in the training data, than elements for other classes. For example, in the case of detecting patients having a rare disease from among general patients, it is known in advance that the class for the patients having the disease will contain a smaller number of elements than the other classes. Accordingly, the class for the patients who have the disease is the minority class in this example. The majority class, by contrast, indicates a class for elements which are previously known to be contained more in the training data, than elements for the minority class.

The predetermined number of elements sampled from the minority class may be the total number of elements in the minority class in the training data. In other words, upon sampling each of datasets, the sampling unit 200 may select all the elements in the minority class in the training data without redundancy, and include the selected elements in the dataset. It is preferable, on the other hand, that the numbers of elements to be included in datasets by sampling from the majority classes differ among the datasets.

More preferably, the ratio between the total number of elements in the majority class and the total number of elements in the minority class sampled as each of the datasets is approximately equal to a predetermined ratio (1:1, for example). Thus, the number of elements in the minority class and the number of elements in the majority class balance out on average while the sizes of the datasets are allowed to vary. This makes it possible to increase the accuracy of the learning processing to be carried out later.

Subsequently, the learning unit 210 reads the plurality of sampled datasets from the storage device 104. Then, the learning unit 210 learns a plurality of models each for classifying elements of the input data 20 into the plurality of classes, on the basis of each of the plurality of read datasets by using a machine learning technique.

A model is data for outputting a result that is obtained by classifying a set of inputted elements into a plurality of classes on the basis of the attributes of each of the inputted elements. The data may represent a rule for carrying out such classification, as in a decision tree, for example. Alternatively, the data may describe a graph (paths) for carrying out such classification, as in a neural network, for example.

Specifically, the learning unit 210 includes learning control units 215 respectively corresponding to the plurality of models to be learnt by using the machine learning technique. When a sampled dataset is inputted, each of the learning control units 215 modifies the data representing the corresponding model. The modification is made such that the result obtained by classifying the elements in the dataset into the plurality of classes if the dataset is inputted to the corresponding model may approximate the result obtained by previously classifying the elements in the dataset into the plurality of classes in the training data. For example, the configuration of the nodes and edges of a decision tree is modified in accordance with the individual elements included in the sampled dataset. The machine learning is carried out on the basis of such modification of data.

The data representing each of the learnt models is stored in the storage device 104. Furthermore, the data representing the learnt models may be outputted to an external device through a telecommunications line, to be used in another computer.

Next, the classification unit 220 classifies the newly inputted input data 20 by using each of the plurality of models learnt by the learning unit 210. Then, the classification unit 220 determines the classification result on the basis of the results obtained from the classifications respectively performed by using the plurality of models. For example, the classification unit 220 may determine a single classification result by a majority decision. A configuration example of this function is shown in FIG. 5.

Figure 5:
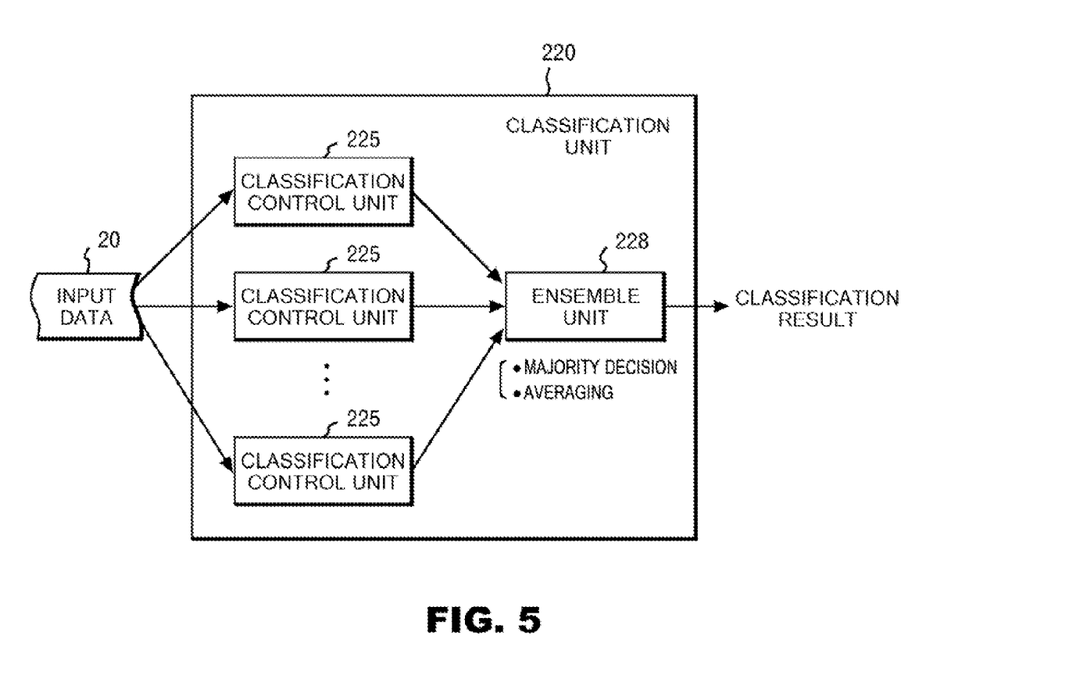
FIG. 5 shows an example of a functional configuration of a classification unit 220 according to the embodiment.

FIG. 5 shows an example of a functional configuration of the classification unit 220 according to this embodiment. The classification unit 220 includes a plurality of classification control units 225 and an ensemble unit 228. The plurality of classification control units 225 respectively uses different models to classify the elements of the input data 20 into the plurality of classes. Since the plurality of classification control units 225 each use a different model as described above, the classification results obtained respectively by the plurality of classification control units 225 may vary in some cases. In response, the ensemble unit 228 determines a single classification result on the basis of the plurality of classification results by using, for example, the majority rule.

For example, assume that there are a total of 9 models. If the 9 models consist of 5 models by which a certain element is classified into Class A and 4 models by which the certain element is classified into Class B, the classification unit 220 may classify the certain element into Class A. Alternatively, a classification process using averaging is as follows, for example.

In some cases, each of the certainty factors of classification results respectively obtained by using models is converted into a numerical value, and the numerical value is outputted. For example, the classification result of a certain element obtained by using a model shows that the certain element is classified into Class A with probability of 55% out of 100% while being classified into Class B with probability of 45% out of 100%. Meanwhile, the classification result of the certain element obtained by using another model shows that the certain element is classified into Class A with probability of 30% out of 100% while being classified into Class B with probability of 70% out of 100%.

In this case, the classification unit 220 averages the certainty factors, respectively obtained by using the models, that the certain element is classified into each of the classes. Specifically, the classification unit 220 calculates the certainty factor that the certain element is classified into Class A to be 42.5%, and the certainty factor that the certain element is classified into Class B to be 47.5%, for example. On the basis of the averaging results, the classification unit 220 determines that the certain element is classified into Class B. The classification result may be displayed on a screen, may be stored in the storage device 104, or may be outputted to an external device through a telecommunications line, for example.

Figure 6:
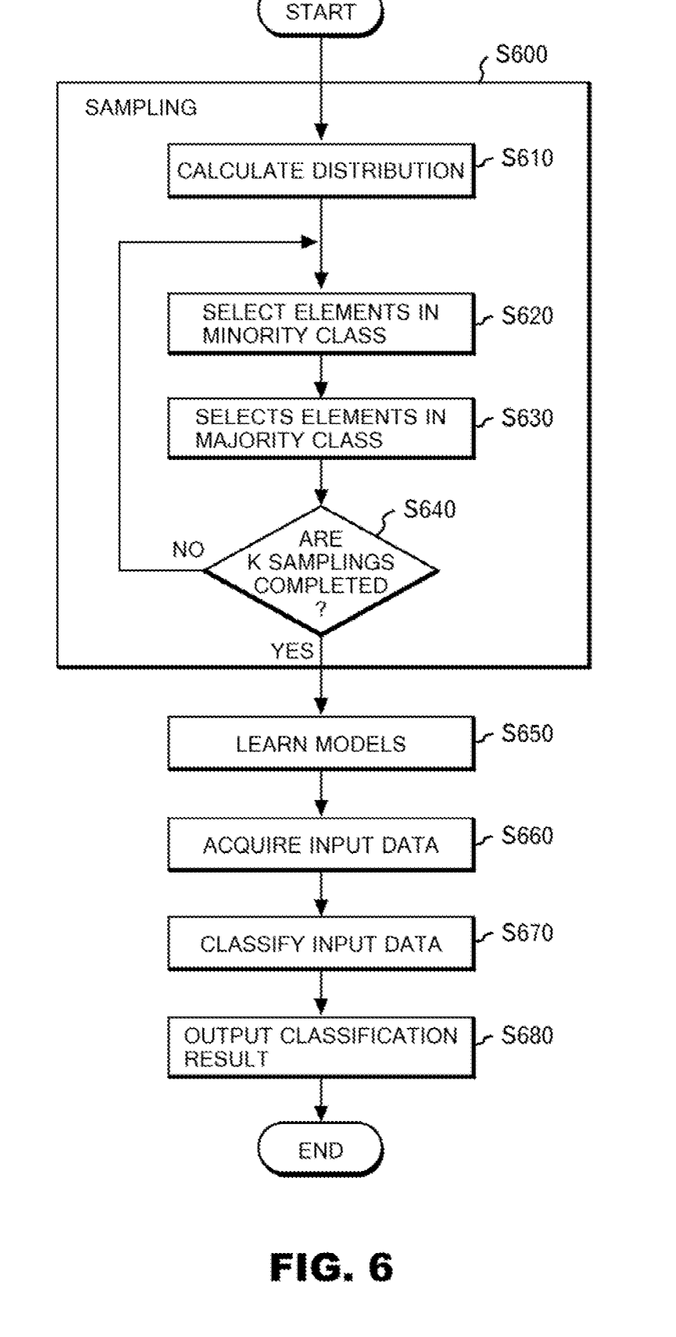
FIG. 6 shows a flow of a process performed by the classification system 106 according to the embodiment, for classifying input data.

FIG. 6 shows a flow of a process performed by the classification system 106 according to this embodiment, for classifying input data. The sampling unit 200 samples a plurality of datasets from the training data (S600). This sampling step includes the following steps S610 to S640 in order for efficient learning of models.

Figure 7:
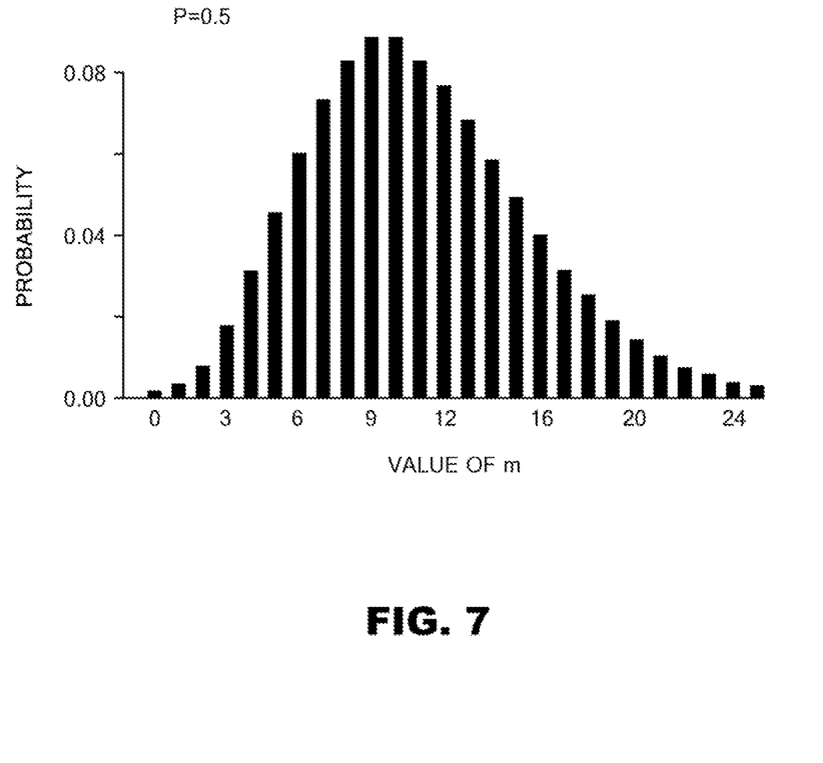
FIG. 7 shows a distribution of the ratio between the number of elements classified into a minority class and the number of elements classified into a majority class in each dataset to be sampled in the embodiment.

Firstly, the sampling unit 200 performs calculation to obtain a distribution of the ratio between the number of elements classified into the minority class and the number of elements classified into the majority class, the elements in either case being to be sampled as each of the datasets (S610). This distribution is based on the negative binomial distribution, for example. An example is shown in FIG. 7, and in Expression 1 below.

[Expression 1]

$$\binom{m+n}{n} p^{(m-1)} \cdot (1-p)^n \qquad \text{Expression 1}$$

In Expression 1, n denotes the number of elements to be sampled from the minority class contained in the training data. As mentioned above, this n is a predetermined constant, and is preferably the total number of elements in the minority class contained in the training data.

Assume that the distribution of the ratio between the number of elements in the minority class and the number of elements in the majority class is based on the negative binomial distribution in the above case. The probability that the number of elements in the majority class is m is equal to the value obtained from Expression 1 given above. Here, p is a real number that is larger than 0 and smaller than 1.

FIG. 7 shows an example of the probability distribution of the element number m where n is set to 10 and p is set to 0.5. The probability density has its peak around m=10, and gradually decreases as the element number m comes closer to 0 or ∞. In this case, the sampling unit 200 may perform calculation to obtain a plurality of ratios as the distribution so that the number of ratios satisfying m=10 or therearound can be largest, such as, m:n={2:10, 4:10, 6:10, 8:10, 9:10, 10:10, 11:10, 13:10, 15:10}.

Next, the sampling unit 200 samples elements from the minority class in accordance with the obtained distribution (S620). The number of elements to be sampled from the minority class is n in Expression 1 given above, and is preferably the total number of elements in the minority class in the training data as previously mentioned. The constant 10 in the example shown in FIG. 7 is one example of the number n.

Alternatively, the sampling unit 200 may perform sampling of a predetermined number of elements with replacement from the minority class by using so-called bootstrapping sampling. In this case, some of the elements in the minority class are not sampled, but instead, other elements in the minority class are repeatedly sampled. Hence, a certain level of classification accuracy can be maintained even when elements, so-called noise, which are not suitable for determining a criterion for classification, are included in the training data.

Next, the sampling unit 200 samples elements from the majority class in accordance with the obtained distribution (S630). The number of elements to be sampled from the majority class is m in Expression 1 given above, and it is preferable that the distribution of ratio n:m is based on the negative binomial distribution, as previously mentioned. Accordingly, to begin with, the sampling unit 200 randomly selects one ratio from the distribution obtained in the step S610. Here, assume that ratio 8:10 is selected.

Then, the sampling unit 200 samples elements from the majority class according to the selected ratio. If the number of elements to be sampled from the minority class is 10, then the number of elements to be sampled from the majority class is 8. In other words, the sampling unit 200 samples 8 elements from the majority class. Specifically, the sampling unit 200 may randomly sample 8 elements by sampling with replacement, or may randomly sample 8 elements by sampling without replacement, from the majority class.

The sampling unit 200 repeats the above process a predetermined number of times K to sample K datasets (S640). Consequently, the predetermined number n of the elements classified into the minority class can be included in each of the sampled K datasets, and also, the total numbers of elements included respectively in the K datasets can be set to differ from each other. In addition, the total number of elements in the minority class and the total number of elements in the majority class in each of the datasets can be set to substantially follow a certain ratio determined in accordance with p in Expression 1 given above.

Hereinabove, use of the negative binomial distribution has been given as an example of a technique for performing such characteristic sampling. It should be noted, however, that a distribution used to determine the ratio between the number of elements in the minority class and the number of elements in the majority class in each of the datasets is not limited to the negative binomial distribution. The ratio may be based on, for example, a distribution that is manually created in advance by a designer or an administrator of the computer 10. Even by using such a distribution, the accuracy in learning models can be increased by including a large part of the elements in the minority class in each of the datasets, and also by making the sizes of the datasets different from each other.

Moreover, the example of sampling elements from two classes, the majority class and the minority class, has been given in the above description. However, elements may be sampled from more than 3 classes. In this case, the number of elements sampled from each class is to be based on the negative multinomial distribution. It is obvious, from the description of the scope of claims of the present invention, that such an example of sampling is also included within the scope of the invention.

Next, the learning unit 210 learns the K models each of which is for classifying the elements in the input data 20 into the plurality of classes on the basis of the corresponding one of the sampled K datasets by using a machine learning technique (S650). The models to be learnt by using the machine learning technique are, for example, in the form of decision tree. Decision tree is used for classifying each of the elements included in an inputted dataset into the plurality of classes on the basis of the attributes of the element.

The learning unit 210 generates an intermediate node (condition satisfaction judging means), and edges (conditions), and leaf nodes (classification results) of each of the decision trees, for model learning. Since techniques for generating nodes and edges are widely known, detailed description thereof is omitted here. The learning unit 210 causes the storage device 104 to store the data representing the models thus generated, which is data on the tree structure including the nodes and the edges in this example, or otherwise outputs such data to an external device.

The classification unit 220 classifies the newly inputted input data 20 in accordance with the plurality of models learnt by the learning unit 210. Then, the classification unit 220 classifies, by using a so-called ensemble learning method, the input data 20 on the basis of the plurality of classification results obtained from the classifications using the plurality of models. For example, the classification unit 220 may determine, by majority decision, a single classification result from the plurality of classification results. It should be noted that a method that the classification unit 220 uses for determining a classification result is not limited to a particular method as long as it is a method known as the so-called ensemble learning (see, for example, the following URL "http://www.hulinks.co.jp/software/randomforests/" for data mining package software using an ensemble learning technique).

The classification result obtained here shows that, when the training data contains only an extremely small number of certain elements among a large number of elements, a set of the certain elements is highly accurately classified into a class. This classification technique makes it possible to judge whether or not a problem is likely to happen if credit approval is given to inquiry subjects having a certain attribute among a number of credit applicants, or to classify a group of patients having a rare disease among a number of patients, for example.

Figure 8:
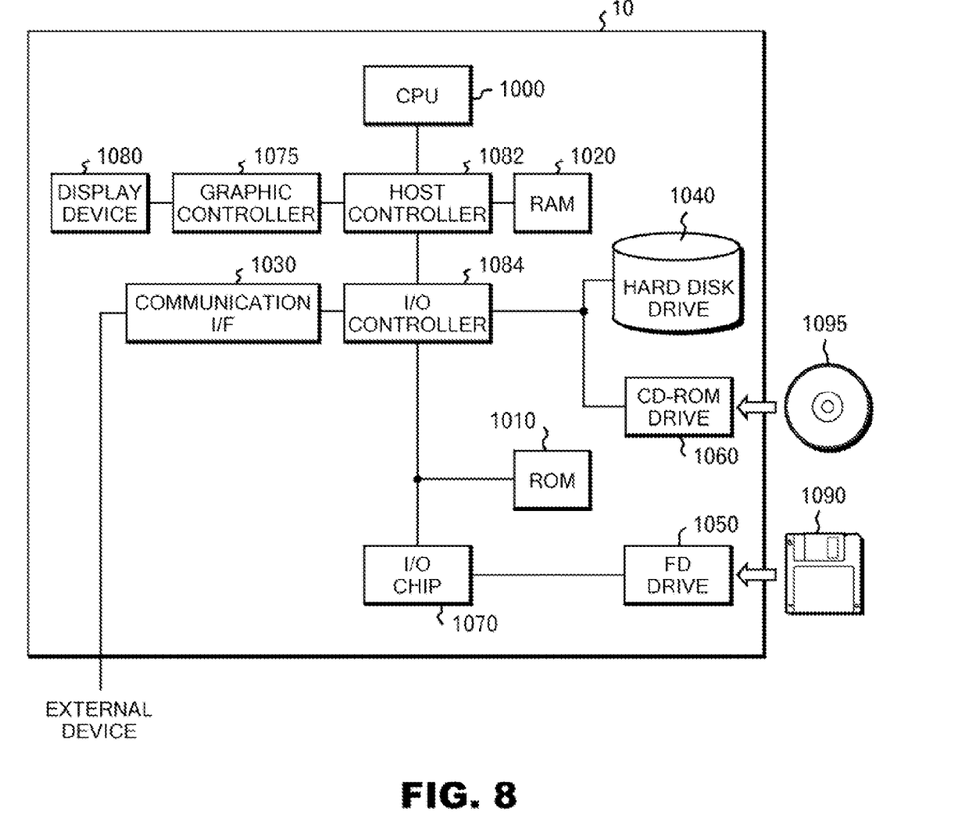
FIG. 8 shows an example of a hardware configuration of the computer 10 according to the embodiment.

FIG. 8 shows an example of a hardware configuration of the computer 10 according to this embodiment. The computer 10 includes a CPU peripheral section, an input/output (I/O) section and a legacy I/O section. The CPU peripheral section includes a CPU 1000, a RAM 1020 and a graphic controller 1075, which are connected to each other through a host controller 1082. The I/O section includes a communication interface 1030, a hard disk drive 1040 and a CD-ROM drive 1060, which are connected to the host controller 1082 through an I/O controller 1084. The legacy I/O section includes a ROM 1010, a flexible disk drive 1050 and an I/O chip 1070, which are connected to the I/O controller 1084.

The host controller 1082 connects the RAM 1020 with the CPU 1000 and the graphic controller 1075, both of which access the RAM 1020 at a high transfer rate. The CPU 1000 operates by using programs stored in the ROM 1010 and the RAM 1020 to control the sections. Specifically, the CPU 1000 reads the programs from the ROM 1010 and the RAM 1020, and then executes the programs, to cause the computer 10 to function as the classification system 106.

The graphic controller 1075 obtains image data generated in a frame buffer provided in the RAM 1020 by the CPU 1000 or the like, and then causes the display device 1080 to display the image. Alternatively, the graphic controller 1075 may include, therein, a frame buffer for storing image data generated by the CPU 1000 or the like.

The I/O controller 1084 connects, to the host controller 1082, the communication interface 1030, the hard disk drive 1040 and the CD-ROM drive 1060, which are relatively-highspeed I/O devices. The communication interface 1030 is an example of the communication interface 102, and communicates with an external device through a network. The communication interface 1030 may obtain, for example, the input data 20 from an external device through a telecommunications line. Moreover, the communication interface 1030 may output, to an external device, data representing the classification result or data representing the learnt models.

The hard disk drive 1040 is an example of the storage device 104, and stores, therein, programs and data used by the computer 10. For example, the hard disk drive 1040 may store the input data 20 obtained from an external device, or may store a program for causing the computer 10 to function as the classification system 106. The CD-ROM drive 1060 loads a program, or reads data, from the CD-ROM 1095, and then provides the loaded program, or the read data, to the RAM 1020 or the hard disk drive 1040.

Furthermore, the ROM 1010 and relatively slow I/O devices such as the flexible disk drive 1050 and the I/O chip 1070 are connected to the I/O controller 1084. The ROM 1010 stores a boot program executed by the CPU 1000 at the time of starting the computer 10, a hardware-dependent program for the computer 10, and the like.

The flexible disk drive 1050 loads a program, or reads data, from a flexible disk 1090, and then provides the loaded program, or the read data, to the RAM 1020 or the hard disk drive 1040 through the I/O chip 1070. The I/O chip 1070 connects, to the I/O controller 1084, the flexible disk drive 1050, and also various I/O devices through, for example, a parallel port, a serial port, a keyboard port and a mouse port. The above-described input data 20 and/or training data may be inputted through the devices connected to the various ports. For example, the input data 20 and/or the training data may be inputted by using a keyboard and a mouse respectively connected to the keyboard port and the mouse port.

A program stored in a storage medium such as the flexible disk 1090, the CD-ROM 1095 and an IC card is provided to the computer 10 by the user. The program is loaded from a storage medium through the I/O chip 1070 and/or the I/O controller 1084, and then is installed in and executed by the computer 10. Since the operation that the program causes the computer 10 and the like to execute is the same as that executed by the classification system 106 described with reference to FIGS. 1 to 7, the description of the operation is omitted here.

The above program may be stored in an external storage medium. Besides the flexible disk 1090 and the CD-ROM 1095, an optical storage medium such as a digital versatile disk (DVD) or a phase change rewritable disk (PD), a magneto-optical storage medium such as a minidisc (MD), a tape medium or a semiconductor memory such as an integrated circuit (IC) card can be used as the storage medium. Moreover, the program may be provided to the computer 10 through as a recording medium, a storage device such as a hard disk or a RAM provided in a server system connected to a dedicated communication network or the Internet.

As described above, the use of the classification system 106 according to this embodiment can enhance an effect of ensemble learning by allowing variations in the number of elements to be sampled, while making maximum use of the information on the elements classified into the minority class. Accordingly, extremely high classification accuracy can be achieved in classification of elements into classes including a minority class. For example, the result of a demonstration experiment carried out by the inventors of the invention of the present application demonstrates that classification accuracy increases, in many cases, by using the classification system 106 compared to the case of using a conventional technique, and that classification accuracy seldom decreases compared to the case of using a conventional technique.

Hereinabove, the present invention has been described on the basis of the embodiment. However, the technical scope of the present invention is not limited to the scope of the description of the above-described embodiment. It is obvious to those skilled in the art that various changes and improvements can be added to the above embodiment. Moreover, it is obvious, from the description of the scope of claims, that an embodiment to which a change or an improvement is made can be also included within the technical scope of the present invention.

That which is claimed is:

1. A system for generating a plurality of models for classifying input data into a plurality of classes on the basis of training data in which elements are previously classified into the plurality of classes, the system comprising:
   a computer processor;
   a sampling unit using the computer processor for sampling, from the training data, a plurality of datasets each including a predetermined number of elements classified into a minority class and a corresponding number of elements classified into a majority class, the corresponding number being determined in accordance with the predetermined number, wherein the sampling unit samples the plurality of datasets from the training data so that a ratio between the number of elements classified into the minority class and the number of elements classified into the majority class in each of the datasets follows a negative multinomial distribution; and
   a learning unit using the computer processor for learning each of the plurality of models for classifying the input data into the plurality of classes, by using a machine learning technique on the basis of the plurality of sampled datasets.

2. The system according to claim 1, further comprising a storage device for storing the training data, wherein:
   the sampling unit samples the plurality of datasets by performing, a plurality of times with a computer operation, a process of randomly reading the predetermined number of elements in the minority class and the corresponding number of elements in the majority class, the corresponding number being determined in accordance with the predetermined number, and then stores the plurality of sampled datasets in the storage device, and
   the learning unit reads the plurality of datasets from the storage device, learns each of the plurality of models with a computer operation using the machine learning technique on the basis of the plurality of read datasets, and then outputs data representing the learnt model.

3. The system according to claim 1, wherein:
   the minority class refers to a class for elements which are previously known to be contained less in the training data than elements for other classes,
   the models each receive a set of elements as an input, and output a result obtained by classifying the inputted set of elements into the plurality of classes,
   the sampling unit samples each of a plurality of datasets from the training data by means of sampling with replacement, and
   the learning unit learns each of the plurality of models such that, when each of the sampled datasets is inputted to the model, the result obtained by classifying the inputted elements of the dataset into the plurality of classes may approximate the result obtained by previously classifying the elements of the dataset into the plurality of classes.

4. The system according to claim 3, wherein the sampling unit samples a plurality of datasets each including the predetermined number of elements classified into the minority class, and including elements the total number of which differ among datasets.

5. The system according to claim 4, wherein:
the predetermined number is the number of elements in the minority class included in the training data, and
the sampling unit samples elements in the minority class by sampling all the elements classified into the minority class from the training data.

6. The system according to claim 4, wherein the sampling unit samples elements in the minority class by randomly sampling, with replacement, the predetermined number of elements from the minority class in the training data.

7. The system according to claim 4, wherein the sampling unit samples elements in the majority class by randomly sampling, with replacement, the corresponding number of elements from the majority class, the corresponding number being determined in accordance with the predetermined number.

8. The system according to claim 4, wherein the sampling unit samples elements in the majority class by randomly sampling, without replacement, the corresponding number of elements from the majority class, the corresponding number being determined in accordance with the predetermined number.

9. The system according to claim 1, wherein the learning unit generates, as the model for each of the sampled datasets, a decision tree for classifying each of the elements included in the dataset into the plurality of classes on the basis of an attribute of the element.

10. The system according to claim 1, further comprising a classification unit which classifies newly inputted data including a plurality of elements, in accordance with each of the plurality of models learnt by the learning unit, and which then classifies the newly inputted data on the basis of a plurality of results obtained from the classifications in accordance with the plurality of models.

11. The system according to claim 1, wherein:
the system is a support system for credit inquiry,
the training data is data in which attributes of inquiry subjects are classified into a plurality of classes depending on whether or not a problem has happened as a result of giving credit approval to the corresponding inquiry subjects,
the input data is data storing attributes of a plurality of inquiry subjects to be newly subjected to credit inquiries,
the sampling unit samples, from the training data, a plurality of datasets each including a predetermined number of elements classified into a class for elements having caused a problem as a result of acquiring credit approval and a corresponding number of elements classified into a class for elements not having caused any problem, the corresponding number being determined in accordance with the predetermined number, and
the learning unit learns each of a plurality of models by using a machine learning technique on the basis of the plurality of sampled datasets, the models used for judging whether or not a problem will happen if a credit approval is given to the inquiry subjects whose attributes are stored in the input data.

12. The system according to claim 1, wherein the negative multinomial distribution is a negative binomial distribution.

13. A method for generating a plurality of models for classifying input data into a plurality of classes on the basis of training data in which elements are previously classified into the plurality of classes, the method comprising the steps of:
sampling, from the training data, a plurality of datasets each including a predetermined number of elements classified into a minority class and a corresponding number of elements classified into a majority class, the corresponding number being determined in accordance with the predetermined number, wherein sampling includes sampling the plurality of datasets from the training data so that a ratio between the number of elements classified into the minority class and the number of elements classified into the majority class in each of the datasets follows a negative multinomial distribution; and
learning each of the plurality of models for classifying the input data into the plurality of classes, on the basis of the plurality of sampled datasets by using a machine learning technique.

14. The method according to claim 13, wherein the negative multinomial distribution is a negative binomial distribution.

15. A program embodied in computer-readable memory for causing a computer to function as a system for generating a plurality of models for classifying input data into a plurality of classes on the basis of training data in which elements are previously classified into the plurality of classes, the program causing the computer to perform the steps of:
a sampling unit sampling, from the training data, a plurality of datasets each including a predetermined number of elements classified into a minority class and a corresponding number of elements classified into a majority class, the corresponding number being determined in accordance with the predetermined number, wherein the sampling unit samples the plurality of datasets from the training data so that a ratio between the number of elements classified into the minority class and the number of elements classified into the majority class in each of the datasets follows a negative multinomial distrubtion; and
a learning unit learning each of the plurality of models used for classifying the input data into the plurality of classes, by using a machine learning technique on the basis of the plurality of sampled datasets.

16. The program embodied in computer-readable memory according to claim 15, wherein the negative multinomial distribution is a negative binomial distribution.

* * * * *